United States Patent [19]

Zerick

[11] Patent Number: 5,341,548
[45] Date of Patent: Aug. 30, 1994

[54] BURIAL/CREMATION CASE FOR ANIMALS

[76] Inventor: Jacquelyn J. Zerick, 837 Country La., Walland, Tenn. 37886

[21] Appl. No.: 18,278

[22] Filed: Feb. 16, 1993

[51] Int. Cl.$^5$ .............................................. A61G 1/00
[52] U.S. Cl. .............................................. 27/28; 27/1; 190/125
[58] Field of Search .................. 27/1, 2, 28, 35, 3; 206/204; 190/125

[56] References Cited

U.S. PATENT DOCUMENTS

| | | | |
|---|---|---|---|
| 3,126,077 | 12/1962 | Marshall | 190/125 |
| 4,544,051 | 10/1985 | Saltz | 19/125 |
| 4,995,345 | 2/1991 | Friedman | 119/160 |
| 5,060,597 | 10/1991 | Fredericks | 119/159 |

FOREIGN PATENT DOCUMENTS 628296 10/1961 Canada .

Primary Examiner—Carl D. Friedman
Assistant Examiner—Kien Nguyen
Attorney, Agent, or Firm—Pitts & Brittian

[57] ABSTRACT

A burial/cremation case (10) for animals for receiving a deceased animal for transporting and burying or cremating the same. The burial/cremation case (10) includes a shell member (12) constructed from a liquid-permeable inner layer (32), an absorbent intermediate layer (40) and an outer layer (36). The intermediate layer (40) is selectively secured to the outer layer (36). The outer layer (36) and inner layer (32) are selectively secured one to the other about their perimeters. The inner layer (32) and outer layer (36) may be folded over and secured to define a volume within which the deceased animal may be received. The intermediate layer (40) includes a fluid impervious barrier (41) to prevent fluids from seeping through the outer layer (36) to the outside of the burial/cremation case (10).

15 Claims, 2 Drawing Sheets

BURIAL/CREMATION CASE FOR ANIMALS

TECHNICAL FIELD

This invention relates to the field of animal containers. More specifically, this invention relates to a burial/cremation case for use in transporting and disposing of dead animals.

BACKGROUND ART

In the field of animal husbandry, it is well known that many pet owners are emotionally attached to their pets. It is also well known that the loss of a pet can be a traumatic experience for its owners. At least one factor adding to the traumatization of the pet owner is the handling of the animal after it has been euthanized or has otherwise deceased. Many pet owners often desire to take their deceased animal to a pet cemetery for burial or crematorium for cremation. If a pet deceases at home, a pet owner may desire to transport the animal to a veterinarian. In either case, it is often necessary to transport the animal after it has died.

It is well known that, after an animal has died, the body fluids begin leaking from the animal. Therefore, in order to transport a dead animal, the animal must first be placed into a receptacle to contain the fluids. Prior to the present invention, deceased animals have been placed in boxes, garbage bags, or the like for transporting and disposing the animals. However, it is not desirable for some to place their animal in such a receptacle because it is not aesthetically pleasing.

Other pet receptacles have been produced for various purposes. Typical of the art are those devices disclosed in the following table of U.S. and Canadian patents:

| PAT. NO. | ISSUED TO | ISSUE DATE |
| --- | --- | --- |
| 3,842,454 | J. P. Young | Oct 22, 1974 |
| 3,997,948 | K. P. Hicks, et al. | Dec 21, 1976 |
| 4,169,428 | D. C. Waugh | Oct 2, 1979 |
| 4,995,345 | H. G. Friedman | Feb 26, 1991 |
| 5,060,597 | C. P. Fredericks | Oct 29, 1991 |
| 628,296 (Can.) | A. M. Bossett | Oct 3, 1961 |

Of these patents, only the U.S. Pat. No. 3,997,948 patent discloses a device (the '948 device) for the burial of a deceased animal. The '948 device is a modular pet burial casket. However, the use of such a device may prove to be cost prohibitive for many people. Further, the construction and size of the casket may make transport of the animal difficult for one person.

The other cited prior art devices are directed toward bag-type receptacles used as bags for transporting a live animal (Canadian Patent No. 628,296), as animal sleeping bags (U.S. Pat. Nos. 3,842,454 and 4,169,428), or as enclosures for treating an animal with selected pesticides (U.S. Pat. Nos. 4,995,345 and 5,060,597). None of these devices provides a means whereby fluids which may drain or leak from the animal may be retained.

Therefore, it is an object of the present invention to provide a means for transporting a deceased animal such that the fluids of the animal may be retained during transport.

It is also an object of the present invention to provide a device wherein a deceased animal may be received for transportation, burial, or cremation.

Another object of the present invention is to provide a means wherein a deceased animal may be cremated while the cremated receptacle itself leaves a minimal amount of residue.

A further object of the present invention is to provide a device which may be used to place an animal to be euthanized thereupon such that once euthanized, the animal need not be moved to a transporting, burial, or crematory receptacle.

DISCLOSURE OF THE INVENTION

Other objects and advantages will be accomplished by the present invention which serves to provide a receptacle for transporting, burying, or cremating deceased animals. Moreover, the burial/cremation case of the present invention is designed to provide an absorbent layer of material for absorbing fluids which drain from the animal, thereby preventing the fluids from leaking out of the burial/cremation case and onto other surfaces. The burial/cremation case of the present invention is constructed such that the animal may be buried or cremated therein.

The burial/cremation case of the preferred embodiment is formed by a shell member constructed from an inner layer, an intermediate layer, and an outer layer. The inner layer is fabricated from a fluid permeable material to allow the animal fluids to filter to the intermediate layer. The intermediate layer is fabricated from a fluid absorbent material and is dimensioned in accordance with its absorbency in order to retain at least the volume of fluids which may drain from the specific animal. One side of the intermediate layer is fabricated from a fluid impervious material to prevent the fluids from leaking through the outer layer to the outside of the burial/cremation case.

The intermediate layer of the preferred embodiment is secured to the outer layer. The outer and inner layers are then secured around their respective perimeters one to the other. The construction is then typically folded over to form top and bottom portions, each of which is symmetrical to the other in relation to the fold line. The top and bottom portions are then secured one to the other in a selected manner to form a volume within which the animal may be placed.

In order to prevent any fluids from leaking through the selected fastener, the burial/cremation case may further include side panels secured to the ends of top and bottom edges of the burial/cremation case. The side panels aid in elevating the zipper above the bottom portion of the burial/cremation case in order to define a volume wherein fluids may be maintained prior to filtration through the inner layer and absorption by the intermediate layer.

Due to the preferred construction of the burial/cremation case of the present invention, it will be seen that the size and weight are minimal. The burial/cremation case may be folded or rolled in any selected manner and stored. The burial/cremation case requires relatively small amounts of space for storage and is lightweight for transport. Handles may be provided for transporting heavier animals.

The burial/cremation case of the present invention is designed such that a veterinarian may lay open the body bag and place an animal to be euthanized thereupon. After euthanization, the burial/cremation case closed. By placing the animal on the burial/cremation case for euthanization, the animal need not be lifted and placed in the burial/cremation case or other receptacle, thereby preventing the visual effects of lifting a lifeless body from the operating table. After the animal has been placed in the burial/cremation case of the present invention, the animal and burial/cremation case may both be buried or cremated. The preferred fabrication of the present burial/cremation case allows for environmentally safe disposal in either selected manner.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
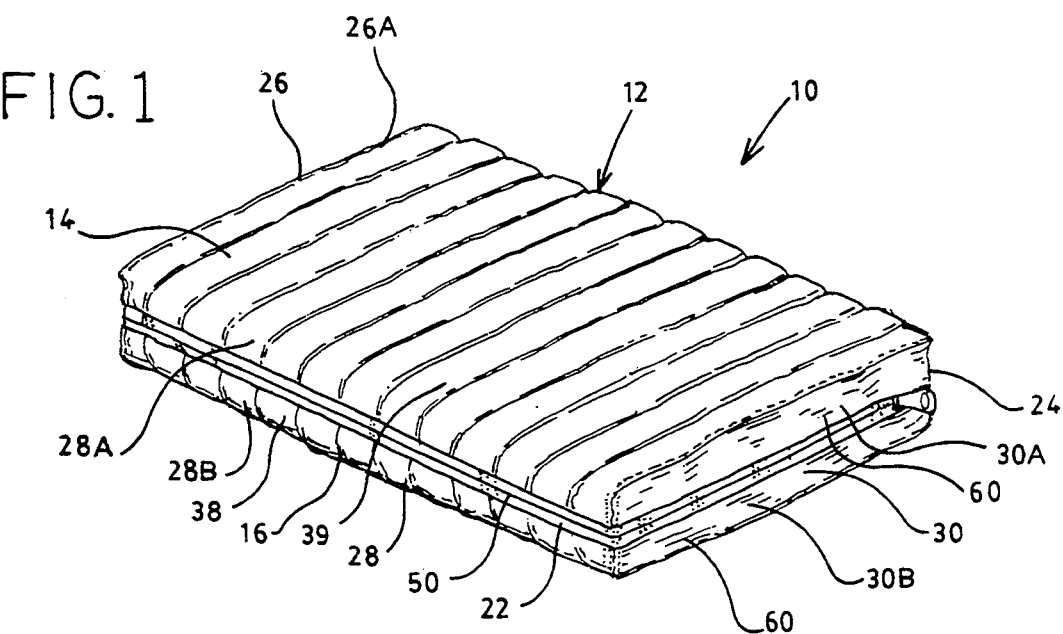
FIG. 1 is a perspective view of the burial/cremation case for animals constructed in accordance with several features of the present invention.

A burial/cremation case for animals incorporating various features of the present invention is illustrated generally at 10 in the figures. The burial/cremation case 10 is designed for transporting, burying, or cremating deceased animals. Moreover, in the preferred embodiment the burial/cremation case 10 is designed to provide an absorbent layer 40 of material for absorbing fluids which drain from the animal 52, thereby preventing the fluids from leaking out of the burial/cremation case 10 and onto other surfaces. The burial/cremation case 10 of the present invention is constructed such that the animal 52 may be buried or cremated therein.

The burial/cremation case 10 of the preferred embodiment is formed by a shell member 12 constructed from an inner layer 32, an intermediate layer 40, and an outer layer 36. The inner and outer layers 32,36 are fabricated from a selected material such as a quilted fabric. In order to permit the fluids to pass to the intermediate layer 40 for absorption, at least the inner layer 32 of the preferred embodiment is fabricated from a fluid permeable material. The intermediate layer 40 is fabricated from an absorbent material and is dimensioned such that the absorbent capacity of the intermediate layer 40 is at least equal to the volume of fluids which might drain from the animal 52. In the preferred embodiment, the side 41 of the intermediate layer 40 which engaged the outer layer 36 is fabricated from a fluid impervious material to prevent the fluids from leaking through the outer layer 36 to the outside of the burial/cremation case 10.

Figure 4:
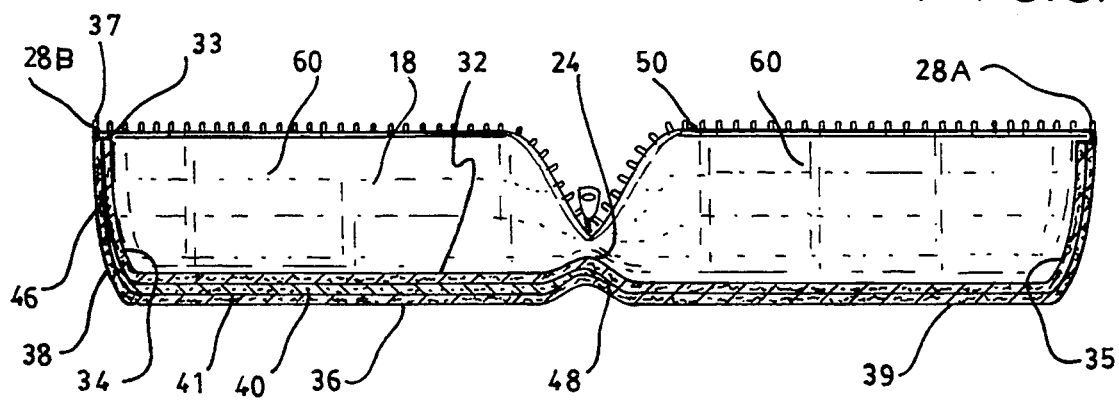
FIG. 4 illustrates a front elevation view, in cross-section, of the burial/cremation case for animals of the present invention taken along 4—4 of FIG. 2.

The inner layer 32 of the preferred embodiment, as shown especially in FIG. 4, is a continuous member from a first end 34 to a second end 35. Similarly, the outer layer 36 is continuous from a first end 38 to a second end 39 and is dimensioned to be substantially similar to the inner layer 32. The inner and outer layers 32,36 are folded such that the respective first and second ends 34,35,38,39 meet to form an envelope-type structure. To this end, top and bottom portions 14,16 are formed, each of which is substantially symmetrical with the other with respect to the fold line 24. As shown in the preferred embodiment, a first edge 24 is defined at the fold line. Second, third, and fourth edges 26,28,30 are defined around the perimeter 22. It will be understood that varying configurations of shell members 12 are anticipated. Though not shown, the shell member 12 may define a substantially circular configuration which yields a semi-circle when folded, thus yielding only first and second edges.

Due to the nature of the fold 24, each of the second, third, and fourth edges 26,28,30 of the preferred embodiment define top edges 26A,28A,30A and bottom edges 26B,28B,30B, the respective top and bottom edges 26A,28A,30A, 26B,28B,30B being selectively secured one to the other to form a volume 20 within which the deceased animal 52 may be placed. As shown, a zipper 50 may be incorporated to selectively secure the respective top and bottom edges 26A, 28A,30A,26B,28B,30B of the second, third, and fourth edges 26,28,30 one to the other.

Figure 3:
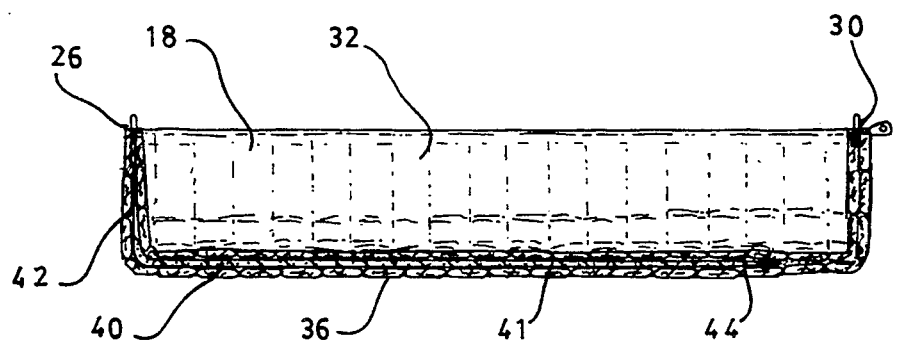
FIG. 3 is a side elevation view, in cross-section, of the burial/cremation case for animals of the present invention taken along 3—3 of FIG. 2.
Figure 3A:
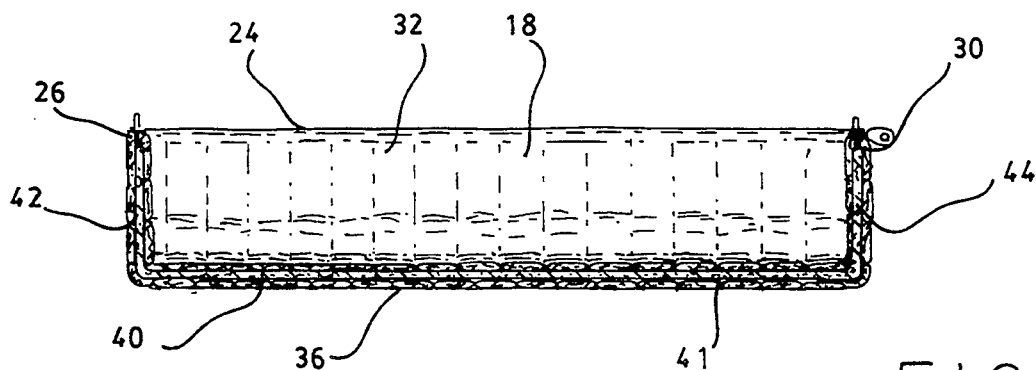
FIG. 3A is a side elevation view, in cross-section, of an alternate embodiment of the burial/cremation case for animals of the present invention taken along 3—3 of FIG. 2.

The intermediate layer 40 of the preferred embodiment is positioned within the shell member 12 to extend from the second edge 26 toward the fourth edge 30 and from the third edge 28 toward the folded first edge 24. As shown in FIG. 3, the intermediate layer 40 may extend only partially between the second and fourth ends 26,30, with a first end 42 thereof positioned substantially at the shell member second edge 26 and a second end 44 positioned along the span between the shell member second and fourth edges 26,30. However, as shown in FIG. 3A, the intermediate layer 40 may extend the full distance between the second and fourth edges 26,30, with the intermediate layer second end 44 positioned substantially at the shell member fourth edge 30.

Similarly, the intermediate layer 40 extends at least partially between the top and bottom edges 28A,28B of the shell member third edge 28. As shown in FIG. 4, the intermediate layer 40 extends only over a portion of the span between the top and bottom edges 28A,28B of the shell member third edge 28, with a third edge 46 of the intermediate layer 40 substantially coinciding with the bottom edge 28B of the shell member third edge 28 and a fourth edge 48 positioned proximate the shell member folded first edge 24. Though not shown, the intermediate layer 40 may extend only partially between the third edge 28 and the folded first edge 24. Alternatively, the intermediate layer fourth edge 48 may substantially coincide with the top edge 28A of the shell member third edge 28.

Therefore, it will be understood that the intermediate layer 40 may extend over the entire area defined by the shell member 12, or any portion thereof, as required. One determining factor which is taken into consideration is the amount of fluids within the body of the deceased animal 52. Another is the absorbency of the intermediate layer 40. The area defined by the intermediate layer 40 should be sufficient to absorb at least as much fluid as may be in the particular animal 52.

The intermediate layer 40 of the preferred embodiment is secured to the outer layer 36 in a selected fashion. Typically, the intermediate layer 40 is secured to the outer layer 36 with a selected adhesive. Hence, the position of the intermediate layer 40 may be maintained with respect to the inner and outer layers 32,36 of the shell member 12. The inner and outer layers 32,36 of the shell member 12 of the preferred embodiment are secured one to the other by sewing around their respective perimeters 33,37. It is foreseeable that other conventional methods may be used as well.

Figure 5:
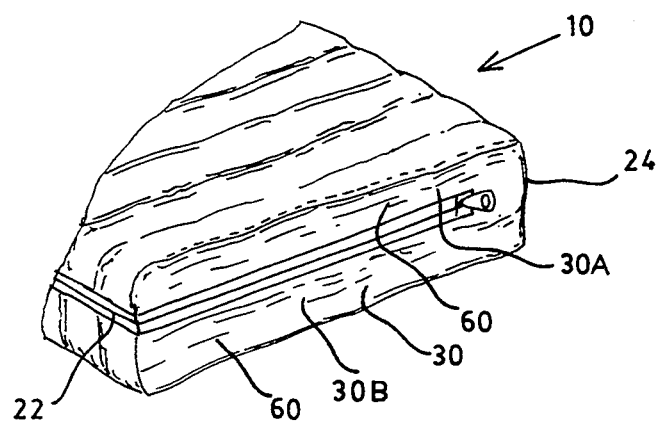
FIG. 5 illustrates a partial perspective view of an alternate embodiment of the burial/cremation case for animals constructed in accordance with several features of the present invention.

In order to prevent any fluids from leaking through the selected fasteners, such as the suggested zipper 50, the shell member 12 may further include side panels 60 secured to the top and bottom edges 26A,26B,30A, 30B of the shell member second and fourth edges 26,30. As shown in FIG. 4, the side panels 60 of the preferred embodiment are substantially rectangular in shape and are integral with and extend from the respective top and bottom edges 26A,26B,30A,30B of the shell member second and fourth edges 26,30. Thus, corners are defined by the shell member 12. Further, the side panels 60 aid in elevating the zipper 50 above the bottom portion 16 of the burial/cremation case 10 in order to define a volume 18 wherein fluids may be maintained prior to filtration through the inner layer 32 and absorption by the intermediate layer 40. It is envisioned that, as shown in FIG. 5, the side panels 60 may be individually cut and sewn to the top and bottom edges 26A,26B,30A,30B of the shell member second and fourth edges 26,30.

Due to the preferred construction of the burial/cremation case 10 of the present invention, it will be seen that the size and weight are minimal. The burial/cremation case 10 may be folded or rolled in any selected manner and stored. The burial/cremation case 10 requires relatively small amounts of space for storage and is lightweight for transport. Though not shown, handles may be provided for transporting heavier animals 52.

Figure 2:
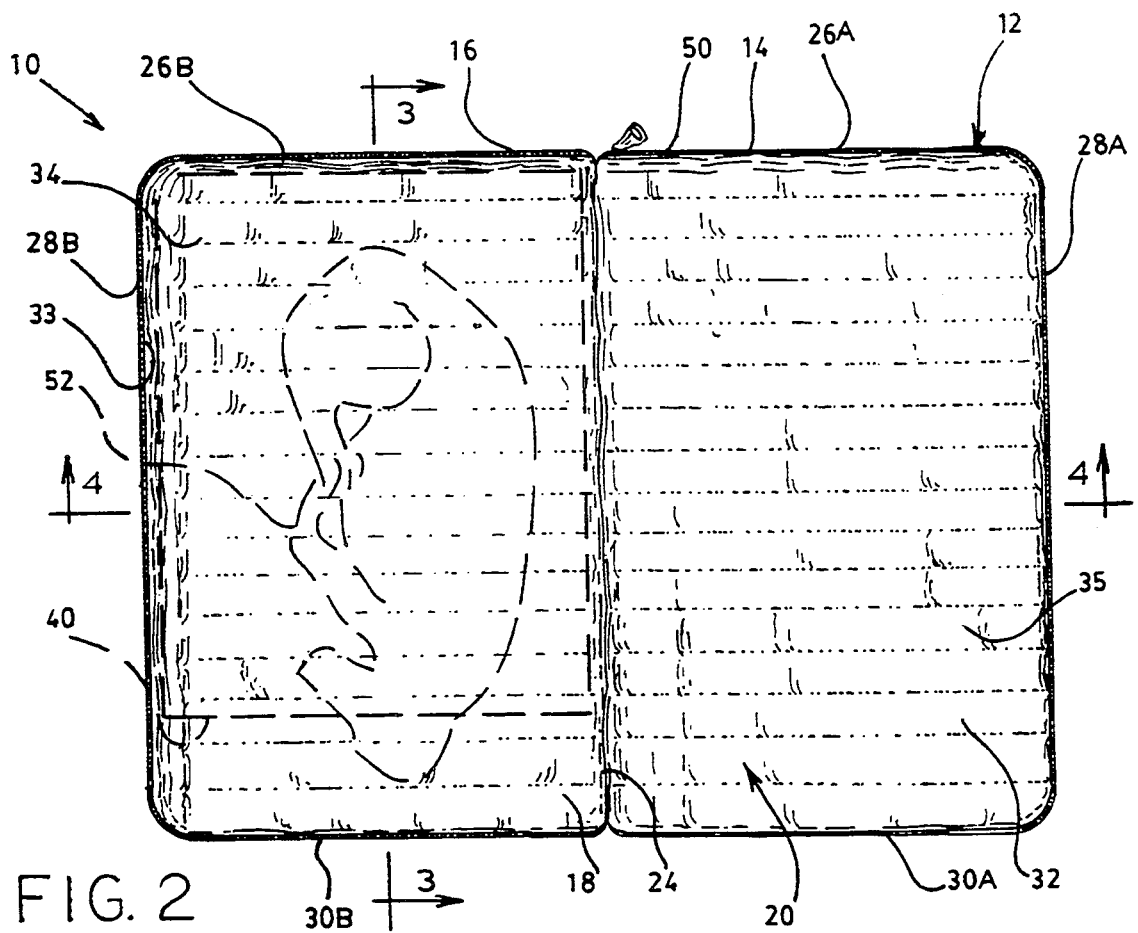
FIG. 2 illustrates a top plan view of the burial/cremation case for animals of FIG. 1 showing the burial/cremation case for animals in an open position for the placement of a deceased animal or a live animal to be euthanized.

The burial/cremation case 10 of the present invention is designed such that a veterinarian may lay open the shell member 12 as shown in FIG. 2 and place an animal 52 to be euthanized thereupon. After euthanization, the shell member 12 may be folded over and closed as described. By placing the animal 52 on the burial/cremation case 10 be for euthanization, the animal 52 need not be lifted and placed in the burial/cremation case 10 or other receptacle, thereby preventing the visual effects of lifting a lifeless body from the operating table.

After the animal 52 has been placed in the burial/cremation case 10 of the present invention, the animal 52 and burial/cremation case 10 may both be buried or cremated. The preferred fabrication of the present burial/cremation case 10 be allows for environmentally safe disposal in either selected manner. When cremation is the selected choice of disposal, the materials of construction of the burial/cremation case 10 may be burned simultaneously with the animal 52. Tests have shown that for a burial/cremation case 10 dimensioned for an average sized dog, a residue of approximately one quarter ($\frac{1}{4}$) cup is yielded. Every element of the burial/cremation case 10, including the selected zipper 50, will convert to ash. This volume of residue is substantially less than that for other conventional articles for burial. For example, a child's blanket may leave a residue of greater than one-half ($\frac{1}{2}$) cup. Obviously, larger blankets will leave an even greater amount of residue. Thus, the reduced volume of ash is more ecologically advantageous than other typical burial receptacles.

From the foregoing description, it will be recognized by those skilled in the art that a burial/cremation case for animals offering advantages over the prior art has been provided. Specifically, the burial/cremation case of the present invention provides a means for receiving a deceased animal for transport and burial or cremation. The burial/cremation case of the present invention is aesthetically pleasing when compared to standard articles of burial such as garbage bags and cardboard boxes. The burial/cremation case of the present invention provides a means whereby the fluids which drain from the animal may be absorbed. When an animal is cremated in the burial/cremation case of the present invention, the burial/cremation case is substantially reduced to a small volume of ash. Furthermore, the burial/cremation case of the present invention is easily stored and is lightweight.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A burial/cremation case for receiving a deceased animal for transport and disposal thereof, said burial/cremation case comprising:

a covering member defining an interior volume dimensioned to receive said deceased animal and an opening dimensioned for passing said deceased animal therethrough and into said volume, said covering member being fabricated from an at least partially absorbent and fluid permeable material, said material being biodegradable, said material further being incinerable;

a fluid retention member carried by said covering member for absorbing and retaining fluids excreted by said deceased animal immediately following death and prior to disposal of said deceased animal in a selected manner, said fluid retention member being configured to coincide with at least a portion of said covering member and dimensioned to absorb a substantial portion of said fluids; and a closure device for selectively closing said opening to prevent unselected removal of said animal and evacuation of said fluids.

2. The burial/cremation case of claim 1 wherein said covering member defines a perimeter having a configuration substantially symmetrical about a central axis, said covering member being folded on said axis to define said interior volume and said opening, said opening being defined by said perimeter.

3. The burial/cremation case of claim 2 wherein said closure device is a zipper, said zipper including a first side and a cooperating second side, said first side of said zipper being secured to said covering member proximate a portion of said perimeter defined between a first end of said central axis in a first direction around said perimeter to a second end of said central axis, said second side of said zipper being secured to said covering member proximate a portion of said perimeter defined between said first end of said central axis in a second direction around said perimeter to said second end of said central axis, said first side of said zipper and said second side of said zipper cooperating to selectively open and close said opening.

4. The burial/cremation case of claim 1 wherein said covering member includes at least a first layer and a second layer, said first layer and said second layer defining a selected configuration having a selected perimeter and being secured one to another proximate said perimeters.

5. The burial/cremation case of claim 4 wherein said fluid retention member is secured between said first layer and said second layer of said covering member.

6. The burial/cremation case of claim 5 wherein said fluid retention member is secured to said second layer of said covering member.

7. A burial/cremation case for receiving a deceased animal for transport and disposal thereof, said burial/cremation case comprising:

a covering member defining an interior volume dimensioned to receive said deceased animal and an opening dimensioned for passing said deceased animal therethrough and into said volume,, said covering member defining a perimeter having a configuration substantially symmetrical about a central axis, said covering member being folded on said axis to define said interior volume and said opening, said opening being defined by said perimeter said covering member being fabricated from an at least partially. absorbent and fluid permeable material, said material being biodegradable, said material further being incinerable;

a fluid retention member carried by said covering member for absorbing and retaining fluids excreted by said deceased animal immediately following death and prior to disposal of said deceased animal in a selected manner, said fluid retention member being configured to coincide with at least a portion of said covering member and dimensioned to absorb a substantial portion of said fluids; and a closure device for selectively closing said opening to prevent unselected removal of said animal and evacuation of said fluids, said closure device being a zipper.

8. The burial/cremation case of claim 7 wherein said zipper includes a first side and a cooperating second side, said first side of said zipper being secured to said covering member proximate a portion of said perimeter defined between a first end of said central axis in a first direction around said perimeter to a second end of said central axis, said second side of said zipper being secured to said covering member proximate a portion of said perimeter defined between said first end of said central axis in a second direction around said perimeter to said second end of said central axis, said first side of said zipper and said second side of said zipper cooperating to selectively open and close said opening.

9. The burial/cremation case of claim 7 wherein said covering member includes at least a first layer and a second layer, said first layer and said second layer defining a selected configuration having a selected perimeter and being secured one to another proximate said perimeters.

10. The burial/cremation case of claim 9 wherein said fluid retention member is secured between said first layer and said second layer of said covering member.

11. The burial/cremation case of claim 10 wherein said fluid retention member is secured to said second layer of said covering member.

12. A burial/cremation case for receiving a deceased animal for transport and disposal thereof, said burial/cremation case comprising:

a covering member defining an interior volume dimensioned to receive said deceased animal and an opening dimensioned for passing said deceased animal therethrough and into said volume, said covering member including at least a first layer and a second layer, said first layer and said second layer defining a selected configuration having a selected perimeter and being secured one to another proximate said perimeters, said covering member being fabricated from an at least partially absorbent and fluid permeable material, said material being biodegradable, said material further being incinerable;

a fluid retention member for absorbing and retaining fluids excreted by said deceased animal immediately following death and prior to disposal of said deceased animal in a selected manner, said fluid retention member being configured to coincide with at least a portion of said covering member and dimensioned to absorb a substantial portion of said fluids, said fluid retention member being secured between said first layer and said second layer of said covering member; and a closure device for selectively closing said opening to prevent unselected removal of said animal and evacuation of said fluids.

13. The burial/cremation case of claim 12 wherein said covering member defines a perimeter having a configuration substantially symmetrical about a central axis, said covering member being folded on said axis to define said interior volume and said opening, said opening being defined by said perimeter.

14. The burial/cremation case of claim 13 wherein said closure device is a zipper, said zipper including a first side and a cooperating second side, said first side of said zipper being secured to said covering member proximate a portion of said perimeter defined between a first end of said central axis in a first direction around said perimeter to a second end of said central axis, said second side of said zipper being secured to said covering member proximate a portion of said perimeter defined between said first end of said central axis in a second direction around said perimeter to said second end of said central axis, said first side of said zipper and said second side of said zipper cooperating to selectively open and close said opening.

15. The burial/cremation case of claim 12 wherein said fluid retention member is secured to said second layer of said covering member.

* * * * *